US007987078B2

(12) United States Patent
Wang

(10) Patent No.: US 7,987,078 B2
(45) Date of Patent: Jul. 26, 2011

(54) DYNAMIC MODELING OF AN INTERNAL COMBUSTION ENGINE OPERATING WITH MULTIPLE COMBUSTION MODES

(75) Inventor: Junmin Wang, Helotes, TX (US)

(73) Assignee: Southwest Research Institute, San Antonio, TX (US)

( * ) Notice: Subject to any disclaimer, the term of this patent is extended or adjusted under 35 U.S.C. 154(b) by 697 days.

(21) Appl. No.: 11/837,036

(22) Filed: Aug. 10, 2007

(65) Prior Publication Data

US 2008/0040085 A1 Feb. 14, 2008

Related U.S. Application Data

(60) Provisional application No. 60/836,818, filed on Aug. 10, 2006.

(51) Int. Cl.
*G06G 7/48* (2006.01)
(52) U.S. Cl. .................................. 703/7; 703/8
(58) Field of Classification Search .................... 703/7, 8
See application file for complete search history.

(56) References Cited

U.S. PATENT DOCUMENTS

| | | | |
|---|---|---|---|
| 5,349,933 A | 9/1994 | Hasegawa et al. | 123/486 |
| 5,546,907 A | 8/1996 | Komoriya et al. | 123/478 |
| 5,597,951 A | 1/1997 | Yoshizaki et al. | 73/118.2 |
| 5,974,870 A | 11/1999 | Treinies et al. | 73/118.2 |
| 6,178,945 B1 | 1/2001 | Suzuki et al. | 123/295 |
| 6,356,831 B1 | 3/2002 | Michelini et al. | 701/56 |
| 6,497,214 B2 | 12/2002 | Yagi | 123/399 |
| 6,708,668 B2 | 3/2004 | Yoshida et al. | 123/295 |
| 6,718,942 B2 | 4/2004 | Burgio et al. | 123/350 |
| 6,805,095 B2 | 10/2004 | Sun et al. | 123/399 |
| 7,111,593 B2 | 9/2006 | Song et al. | 123/673 |
| 7,389,173 B1 | 6/2008 | Wang | |
| 7,565,237 B2 | 7/2009 | Wang | |
| 2005/0241298 A1 | 11/2005 | Bayerle et al. | 60/284 |
| 2007/0208489 A1* | 9/2007 | Borean et al. | 701/103 |
| 2008/0022677 A1* | 1/2008 | Barbe et al. | 60/599 |

FOREIGN PATENT DOCUMENTS

| | | |
|---|---|---|
| JP | 63080044 | 4/1988 |
| JP | 10220270 | 8/1998 |

OTHER PUBLICATIONS

Jesper Ritzen (Modelling and Fixed Step Simulation of a Turbo Charged Diesel Engine, Jun. 2003).*

* cited by examiner

*Primary Examiner* — Paul L Rodriguez
*Assistant Examiner* — Andre Pierre Louis
(74) *Attorney, Agent, or Firm* — Ann C Livingston

(57) ABSTRACT

A method of modeling a diesel engine that is capable of multiple combustion modes and equipped with a turbocharger and EGR loop. The model comprises a set of equations, each equation representing one of the following as a time derivative: pressure at the intake manifold, pressure between the turbine and an intake manifold throttle, pressure at the exhaust manifold, the compressor power, and the fresh air fraction (the ratio of fresh air to EGR). The model is used to determine what engine conditions (such as throttle positions and turbocharger output) will result in desired pressures and fresh air fraction.

8 Claims, 1 Drawing Sheet

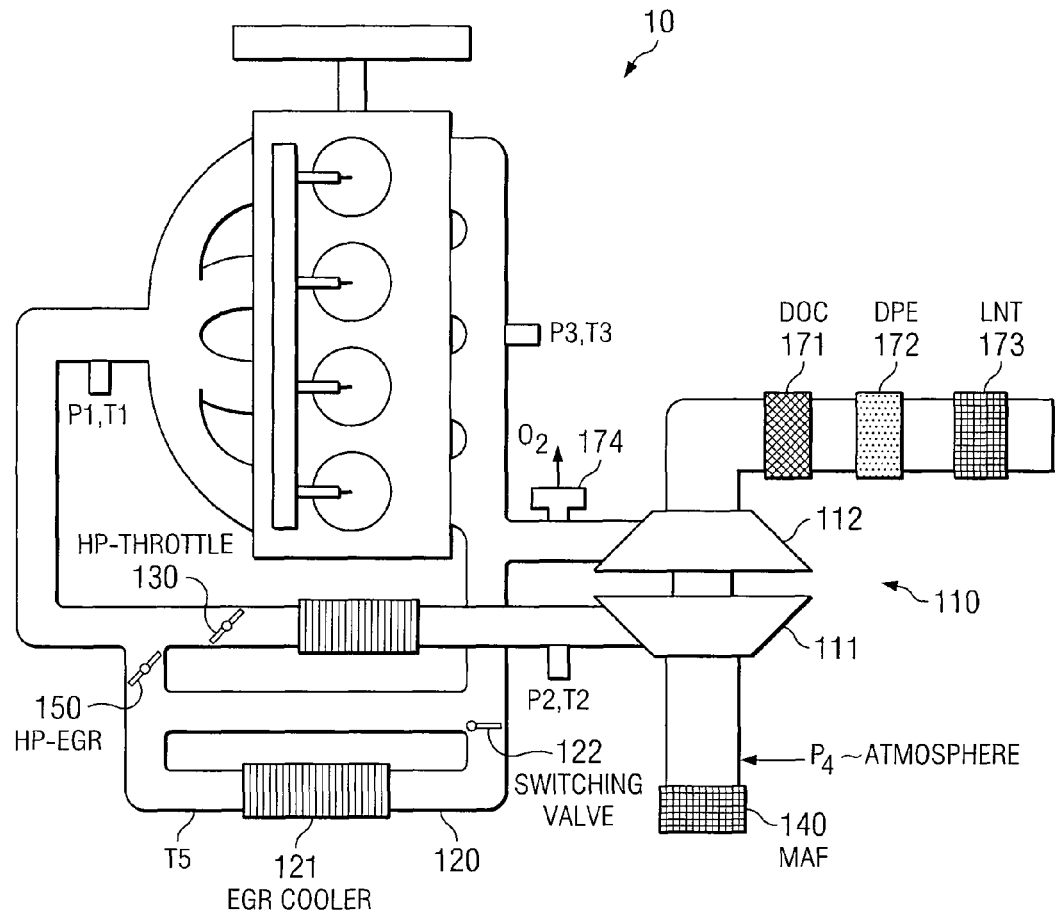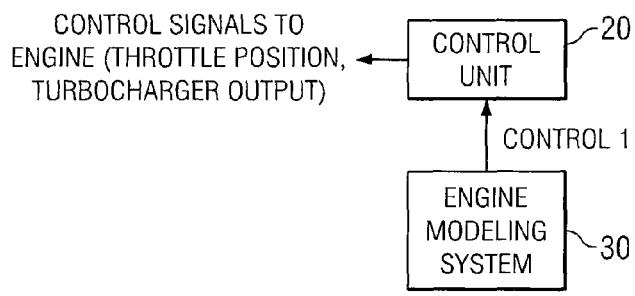

US 7,987,078 B2

DYNAMIC MODELING OF AN INTERNAL COMBUSTION ENGINE OPERATING WITH MULTIPLE COMBUSTION MODES

RELATED PATENT APPLICATION

This application claims the benefit of U.S. Provisional Application No. 60/836,818, filed Aug. 10, 2006 and entitled "DYNAMIC MODELING OF AN INTERNAL COMBUSTION ENGINE OPERATING WITH MULTIPLE COMBUSTION MODES."

TECHNICAL FIELD OF THE INVENTION

This invention relates to control systems for internal combustion engines, and more particularly to a control system for an internal combustion engine having multiple combustion modes.

BACKGROUND OF THE INVENTION

In recent years, it has become apparent that conventional diesel combustion cannot alone meet emission levels mandated for the future. Hence, diesel engine manufacturers have been considering multiple combustion modes as a means to reduce emissions. Alternate combustion modes such as homogeneous charge compression ignition (HCCI), low temperature combustion (LTC), and premixed charge compression ignition (PCCI) are being developed and implemented on diesel engines, together with conventional diesel combustion.

At steady-state, alternate combustion modes offer great potential to reduce engine emission levels. However, because the applicable speed-load regions of different combustion modes are different from each other, the engine must seamlessly switch among these modes.

The different combustion modes are achieved by different fueling and in-cylinder conditions. Some modes are close to the edge of unstable combustion, and are very sensitive to engine conditions.

For diesel engines, fueling control can be exercised precisely on a cycle-by-cycle basis. However, in-cylinder conditions change at a much slower rate (over several combustion cycles). Poor control over in-cylinder conditions not only diminishes the merits of alternate combustion modes but also worsens drivability and emissions.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 1 illustrates a diesel engine suitable for multiple combustion modes, modeled in accordance with the invention.

DETAILED DESCRIPTION OF THE INVENTION

Dynamic Engine Model as Basis for Control System

One approach to designing control systems for engine in-cylinder conditions is to first develop a dynamic model of the engine. The model can be implemented in a graphical simulation environment, using real or simulated engine conditions as inputs. Appropriate software is used to build the model and to manage data.

Once the model is developed, additional software can be used to develop an engine controller that can accept various engine conditions and achieve desired performance. After developing and tuning the control system through simulations, control system programming is easily generated for production-level controller hardware. In sum, good engine models are indispensable for a transition from a rapid prototyping controller to a production-level controller.

For purposes of this invention, the modeling is of the intake and exhaust of an engine operating with multiple combustion modes. The dynamics of various intake and exhaust passage sections and components of the engine are modeled, based on physical laws with intentional simplifications and reductions. The resulting dynamic model is used as the basis for design of an in-cylinder engine condition control system.

A feature of the model is that it models only those engine characteristics necessary for multiple mode engine control. That is, it does not attempt to comprehensively model the entire engine. Various simplifications are made, such as modeling the turbocharger dynamics as a first order system. The model thereby simplifies the process of designing a control system suitable for controlling multiple engine mode transitions.

Dynamic Engine Modeling System

FIG. 1 illustrates an engine 100, capable of operating with multiple combustion modes. An example of such an engine 100 is a light duty 4-cylinder common rail diesel engine. The engine is equipped with a turbocharger 110, and a high pressure EGR loop 120 with two paths (cooled and uncooled). The tailpipe has various exhaust treatment devices, such as a diesel oxidation catalyst 171, diesel particulate filter 172, and lean NOx trap 173.

Modeling system 30 models engine 10 for purposes of designing a control system 20 for operation of, and transitioning between, multiple engine modes. As explained below, modeling system 30 is used to determine how various actuators can be controlled to provide desired pressure and air fraction conditions of engine 10. Modeling system 30 can be implemented with computer equipment programmed to store and execute the equations and data described herein. As explained above, control system 20 is designed using modeling system 30, and for production engines is implemented with appropriate engine control system hardware and software.

Various sections associated with the air intake and exhaust of engine 100 are each represented in the model. These include:

Section 1 intake manifold (between the high-pressure throttle and high-pressure EGR valve and engine intake valves)

Section 2 intake passage between compressor and high pressure throttle

Section 3 exhaust manifold

Section 4 intake to turbocharger

As compared to a model for an engine having only conventional combustion, a model of engine 100 requires more variables and system states. In general, evolution of in-cylinder conditions can be viewed as a multi-variable nonlinear system.

The model described herein may be generally described as an "engine intake and exhaust system dynamic model". The actuators of interest for the model are the turbocharger 110 (its output flow), the intake manifold throttle 130, and EGR throttle 150. The model is especially directed to the dynamics of the fresh air fraction in the intake manifold, that is, the ratio of fresh air from the compressor to the amount of recirculated exhaust gas, and the various pressures.

The actuators are used to control the fresh air fraction and pressure so that these parameters are appropriate for a given combustion mode. If a desired pressure or fresh air fraction is known, model system 30 can be used to determine how to actuate throttles 130 and 150 and the output of turbocharger 110.

Turbocharger 110 has a compressor 111 and turbine 112, and is assumed to be a variable output turbocharger. An example of a suitable turbocharger is a variable geometry turbocharger (VGT). As explained below, the compressor power is modeled as a differential equation.

Engine 100 also has an EGR (exhaust gas recirculation loop), which is a high pressure loop. EGR cooler 121 cools the exhaust before it is mixed with fresh air from the compressor 111.

Temperatures at various intake and exhaust points of engine 100 are also represented in the model. FIG. 1 illustrates the location of various temperature and pressure measurement sensors, for sensing T1, T2, and T3 (temperatures) and P1, P2, and P3 (pressures). Some temperature and pressure values can be inferred or assumed. For example, P4 is assumed to be the atmospheric pressure. T5 can be inferred from T2 and the intercooler efficiency. An O2 sensor 174 is installed to measure the O2 in the exhaust from the exhaust manifold.

Engine 100 has several intake or exhaust sections, which are labeled 1-4 in FIG. 1. The intake and exhaust modeling is based on principles of mass and energy conservation as well as the ideal gas law.

Engine Intake and Exhaust Pressures

Section 1 of engine 100 is the intake manifold (between the high-pressure throttle and high-pressure EGR valve and engine intake valves). The HP throttle 130 permits P1 to be lower than atmospheric, which may be necessary for one or more combustion modes (such as an LT combustion mode).

From principles of conservation of mass:

$$\dot{m}_1 = W_{HT} + W_{HEGR} - W_e \quad (1)$$

where:
$m_1$: mass of gas in the intake manifold;
$W_{HT}$: mass flow rate through the high-pressure throttle valve body, which can be modeled using a standard orifice flow equation;
$W_{HEGR}$: mass flow rate through the high-pressure EGR valve body, which can be modeled using a standard orifice flow equation; and
$W_e$: mass flow rate into the cylinders, which can be described with a speed density equation as:

$$W_e = \frac{\eta_v p_1 N_e V_d}{R T_1 120},$$

where $\eta_v$ is the volumetric efficiency which can be fitted as a function of engine speed, intake manifold pressure and exhaust manifold pressure.

From principles of energy conservation, $$\frac{d}{dt}(m_1 u_1) = W_{HT} h_{HT} + W_{HEGR} h_{HEGR} - W_e h_e - \dot{Q}_{1w} \quad (2)$$

where:
$u_1$: specific internal energy of the gas;
$h_{HT}$: specific enthalpy of the gas from high-pressure throttle;
$h_{HEGR}$: specific enthalpy of the gas from high-pressure EGR valve;
$h_e$: specific enthalpy of the gas into the cylinders; and
$\dot{Q}_{1w}$: heat loss rate through the intake manifold wall.

Section 2 of engine 100 is the intake section between the compressor 111 and high-pressure throttle valve 130. From principles of mass conservation:

$$\dot{m}_2 = W_C - W_{HT} \quad (3)$$

where:
$W_C$: mass flow rate from the compressor; and
$m_2$: mass of gas in this section.

From the energy conservation, $$\frac{d}{dt}(m_2 u_2) = W_C h_C - W_{HT} h_{HT} - \dot{Q}_2 \quad (4)$$

where:
$u_2$: specific internal energy of the gas;
$h_C$: specific enthalpy of the gas from the compressor; and
$\dot{Q}_2$: heat loss rate through the manifold wall and intercooler.

$$\text{With } h = C_p T, \gamma = C_p/C_v \text{ and } u = C_v T, \quad (5)$$

$$\text{then } \frac{d}{dt}(mu) = \dot{m} C_v T + m C_v \dot{T}$$

From Equations (2) and (5), $$\dot{m}_1 C_v T_1 + m_1 C_v \dot{T}_1 = W_{HT} C_v \gamma T_{HT} + W_{HEGR} C_v \gamma T_{HEGR} - W_e C_v \gamma T_e - \dot{Q}_{1w} \quad (6)$$

$$\dot{m}_2 C_v T_2 + m_2 C_v \dot{T}_2 = W_C C_v \gamma T_C - W_{HT} C_v \gamma T_{HT} - \dot{Q}_2 \quad (7)$$

From the ideal gas law, $$pV = mRT \quad (8)$$

$$\dot{p} = \frac{R}{V} \dot{m} T + \frac{R}{V} m \dot{T}, \quad (9)$$

where:
$C_p$: specific heat at constant pressure;
$C_v$: specific heat at constant volume;
$\gamma$: specific heat ratio;
$T$: absolute temperature;
$V$: volume of the gas;
$p$: pressure of the gas; and
$R$: gas constant.

From Equations (6), (9) and (1), (6) and ignoring the heat loss through the intake manifold wall, the following differential equations can be obtained for the Section 1 pressure and temperature:

$$\dot{p}_1 = \frac{R\gamma}{V_1}(W_{HT} T_{HT} + W_{HEGR} T_{HEGR} - W_e T_e) \quad (10)$$

$$\dot{T}_1 = \frac{1}{m_1}[W_{HT}(\gamma T_{HT} - T_1) + W_{HEGR}(\gamma T_{HEGR} - T_1) + \qquad (11)$$
$$W_e(T_1 - \gamma T_e)]$$
$$= \frac{RT_1}{p_1 V_1}[W_{HT}(\gamma T_{HT} - T_1) + W_{HEGR}(\gamma T_{HEGR} - T_1) +$$
$$W_e(T_1 - \gamma T_e)]$$

Similarly, from Equations (7), (9) and (1), (7), the following differential equations can be obtained for the Section 2 pressure and temperature:

$$\dot{p}_2 = \frac{R\gamma}{V_2}(W_C T_C - W_{HT} T_{HT}) \qquad (12)$$

$$\dot{T}_2 = \frac{RT_2}{p_2 V_2}[W_C(\gamma T_C - T_2) + W_{HT}(T_2 - \gamma T_{HT})] \qquad (13)$$

Section 4 in FIG. 1 is usually short and small. Its dynamics can be ignored. Then, $$W_C = W_a \qquad (14)$$

where, $W_a$: mass flow rate of the fresh air, which is measured by a MAF sensor.

For Section 3, the exhaust manifold, a similar modeling approach as for the intake manifold gives the following dynamics of $P_3$ and $T_3$:

$$\dot{p}_3 = \frac{R\gamma}{V_3}[W_{eo} T_{eo} - T_3(W_{HEGR} + W_t)] \qquad (15)$$

$$\dot{T}_3 = \frac{RT_3}{p_3 V_3}[W_{eo}(\gamma T_{eo} - T_3) + W_t(T_3 - \gamma T_t) + W_{HEGR}(T_3 - \gamma T_{HEGR})] \qquad (16)$$

Turbocharger

The turbocharger 110 consists of a turbine 112, which is driven by the exhaust gas and connected via a shaft to the compressor 111, which compresses the intake fresh air from MAF sensor 140. The rotational speed of the turbocharger shaft can be derived based on the power balance between the turbine and the compressor as:

$$\dot{N}_t = \left(\frac{60}{2\pi}\right)^2 \frac{P_t - P_c}{J_t N_t}, \qquad (17)$$

where $N_t$ is the speed of the turbocharger shaft;
$J_t$ is the inertia of the turbocharger;
$P_c$ is the compressor power; and
$P_t$ is the turbine power.

Assuming the compression process is isentropic, the temperature and pressure at the inlet and outlet of the compressor 111 have the following relation:

$$\left(\frac{T_{2,is}}{T_4}\right) = \left(\frac{p_2}{p_4}\right)^{\frac{\gamma-1}{\gamma}} \qquad (18)$$

Due to enthalpy losses across the compressor, the compression process is not actually isentropic. The compressor isentropic efficiency is introduced as:

$$\eta_c = \frac{T_{2,is} - T_4}{T_2 - T_4} \qquad (19)$$

From Equations (18) and (19), the following equation for the temperature of the compressor outlet can be obtained:

$$T_2 = T_4 + \frac{1}{\eta_c} T_4 \left(\left(\frac{p_2}{p_4}\right)^{\frac{\gamma-1}{\gamma}} - 1\right) \qquad (20)$$

From the first law of thermodynamics, the compressor power can be expressed as:

$$P_c = W_c(h_2 - h_4) = W_c C_p(T_2 - T_4) \qquad (21)$$

Using Equations (20) and (21), the compressor power can be given as:

$$P_c = W_c C_p T_4 \frac{1}{\eta_c} \left(\left(\frac{p_2}{p_4}\right)^{\frac{\gamma-1}{\gamma}} - 1\right) \qquad (22)$$

The compressor efficiency is a nonlinear function of the pressure ratio across the compressor and the turbocharger shaft speed, which can be obtained from the manufacture's data or calibrated from bench test.

Similarly, the turbine outlet temperature and power can be obtained:

$$T_t = T_3 - \eta_t T_3 \left(1 - \left(\frac{p_t}{p_3}\right)^{\frac{\gamma-1}{\gamma}}\right) \qquad (23)$$

$$P_t = W_t C_p T_3 \eta_t \left(1 - \left(\frac{p_t}{p_3}\right)^{\frac{\gamma-1}{\gamma}}\right) \qquad (24)$$

For the controller design purposes, the dynamics of turbocharger 110 can be simplified as a first-order system with a time constant $\tau_{tc}$. The compressor power dynamics can be approximated as:

$$\frac{dP_c}{dt} = \frac{1}{\tau_{tc}}(P_t - P_c) \qquad (25)$$

EGR Cooler and Intercooler

The temperature drop due to the EGR cooler 121 and intercooler are approximated using the heat exchanger effectiveness as well as the upstream and coolant temperature as:

$$T_{down} = \eta_{he} T_{coolant} + (1 - \eta_{he}) T_{up} \qquad (26)$$

So, for the EGR gas, when the path with EGR cooler is turned on by the switching valve 122, the high-pressure EGR temperature becomes, $$T_{HEGR} = \eta_{ec} T_{coolant} + (1-\eta_{ec}) T_3 \qquad (27)$$

The temperature of the gas passing through the high-pressure throttle 150 is:

$$T_{HT} = \eta_{ic} T_{coolant} + (1-\eta_{ic}) T_2 \qquad (28)$$

Fresh Air Fraction Estimation

Diesel engines, such as engine 100, are usually operated at lean conditions, and use EGR. Thus, there are two paths providing air into engine 100: the fresh air through the MAF sensor 140 and the unburned air from the high-pressure EGR path 120.

The dynamics of the fresh air fraction in the intake manifold is modeled in order to realize accurate in-cylinder condition estimation and control. For the intake manifold system including Sections 1, 2, 3, and 4, the dynamics of the air fraction can be described as:

$$\dot{F}_1 = \frac{RT_1}{p_1 V_1}[W_{HT}(F_2 - F_1) + W_{HEGR}(F_3 - F_1)] \qquad (29)$$

$$\dot{F}_3 = \frac{RT_3}{p_3 V_3} W_{eo}(F_{eo} - F_3) \qquad (30)$$

$$F_{eo} = \frac{W_e F_1 - W_f AFR_s}{W_e + W_f}, \qquad (31)$$

where $W_{eo} = W_e + W_f$ is the flow rate coming out of the cylinders;

$W_f$ is the fueling rate; and $AFR_s$ is the stoichiometric air to fuel ratio.

$$F_2 = F_4 = 1.0 \qquad (32)$$

Rearranging Equations (29)-(32), the following state-space representation for the fresh air fractions can be obtained:

$$\begin{bmatrix} \dot{F}_1 \\ \dot{F}_3 \end{bmatrix} = \begin{bmatrix} -\frac{RT_1}{p_1 V_1}(W_{HT} + W_{HEGR}) & \frac{RT_1}{p_1 V_1} W_{HEGR} \\ \frac{RT_3}{p_3 V_3} W_e & -\frac{RT_3}{p_3 V_3}(W_e + W_f) \end{bmatrix} \begin{bmatrix} F_1 \\ F_3 \end{bmatrix} + \qquad (33)$$

$$\begin{bmatrix} \frac{RT_1}{p_1 V_1} W_{HT} \\ -\frac{RT_3}{p_3 V_3} W_f AFR_s \end{bmatrix}$$

The mass flow rate through the EGR valve 150 can be modeled using the standard orifice flow equation as below.

$$W_{HEGR} = \begin{cases} A_{EGR}(u_{EGR}) \frac{p_3}{\sqrt{RT_{HEGR}}} \left[\gamma^{\frac{1}{2}}\left(\frac{2}{\gamma+1}\right)^{\frac{\gamma+1}{2(\gamma-1)}}\right], \\ \frac{p_1}{p_3} \leq \left(\frac{2}{\gamma+1}\right)^{\frac{\gamma+1}{2(\gamma-1)}} \\ A_{EGR}(u_{EGR}) \frac{p_3}{\sqrt{RT_{HEGR}}} \sqrt{\frac{2\gamma}{\gamma-1}\left[\left(\frac{p_1}{p_3}\right)^{\frac{2}{\gamma}} - \left(\frac{p_1}{p_3}\right)^{\frac{\gamma+1}{\gamma}}\right]}, \\ \frac{p_1}{p_3} > \left(\frac{2}{\gamma+1}\right)^{\frac{\gamma+1}{2(\gamma-1)}} \end{cases} \qquad (34)$$

where $A_{EGR}(u_{EGR})$ is the effective area of the EGR valve as a function of $u_{EGR} \in [0,1]$ being the normalized EGR valve opening.

The mass flow rate through turbine 112 can be approximately modeled using orifice equation as:

$$W_t = A_t\left(\frac{p_3}{p_t}, u_{VGT}\right) \frac{p_3}{\sqrt{RT_3}} \sqrt{\frac{2\gamma}{\gamma-1}\left[\left(\frac{p_t}{p_3}\right)^{\frac{2}{\gamma}} - \left(\frac{p_t}{p_3}\right)^{\frac{\gamma+1}{\gamma}}\right]} \qquad (35)$$

The value $p_t$ is the pressure downstream of turbine 112, which can be approximately modeled as a simplified orifice equation:

$$p_t = p_a + \frac{0.5 RT_t}{p_a}\left[\frac{W_C + W_f}{A_a}\right]^2 \qquad (36)$$

The value $A_a$ is the effective throttle area of the exhaust treatment devices, which in the example of FIG. 1, are DOC 171, DPF 172, and LNT 173. The value $p_a$ is the atmosphere pressure. The value $p_t$ can be calculated based on a measured delta pressure across the exhaust treatment devices.

The mass flow rate through the high-pressure throttle valve can be modeled using the standard orifice flow equation as below.

$$W_{HT} = \begin{cases} A_{HT}(u_{HT}) \frac{p_2}{\sqrt{RT_{HT}}} \left[\gamma^{\frac{1}{2}}\left(\frac{2}{\gamma+1}\right)^{\frac{\gamma+1}{2(\gamma-1)}}\right], \\ \frac{p_1}{p_2} \leq \left(\frac{2}{\gamma+1}\right)^{\frac{\gamma+1}{2(\gamma-1)}} \\ A_{HT}(u_{HT}) \frac{p_2}{\sqrt{RT_{HT}}} \sqrt{\frac{2\gamma}{\gamma-1}\left[\left(\frac{p_1}{p_2}\right)^{\frac{2}{\gamma}} - \left(\frac{p_1}{p_2}\right)^{\frac{\gamma+1}{\gamma}}\right]}, \\ \frac{p_1}{p_2} > \left(\frac{2}{\gamma+1}\right)^{\frac{\gamma+1}{2(\gamma-1)}} \end{cases} \qquad (37)$$

where $A_{HT}(u_{HT})$ is the effective area of the high-pressure throttle valve as a function of $u_{HT} \in [0,1]$ being the normalized high-pressure throttle valve opening position.

Resultant Engine Intake Dynamic Model

In sum, the following state-space engine intake dynamic model can be expressed with the following mathematical functions, each in terms of one of five engine conditions: p1, p2, p3, Pc, and F1.

$$\dot{p}_1 = \frac{R\gamma}{V_1}(W_{HT}T_{HT} + W_{HEGR}T_{HEGR} - W_e T_e) \quad (38)$$

$$\dot{p}_2 = \frac{R\gamma}{V_2}(W_C T_C - W_{HT}T_{HT}) \quad (39)$$

$$\dot{p}_3 = \frac{R\gamma}{V_3}[W_{eo}T_{eo} - T_3(W_{HEGR} + W_t)] \quad (40)$$

$$\dot{P}_c = \frac{1}{\tau_{tc}}(P_t - P_c) = -\frac{P_c}{\tau_{tc}} + \frac{1}{\tau_{tc}}C_p T_3 \eta_t \left[1 - \left(\frac{p_t}{p_3}\right)^{\frac{\gamma-1}{\gamma}}\right]W_t \quad (41)$$

$$\dot{F}_1 = \frac{RT_1}{p_1 V_1}[W_{HT}(F_2 - F_1) + W_{HEGR}(F_3 - F_1)], \quad (42)$$

where $$W_C = \frac{P_c \eta_c}{C_p T_4 \left[\left(\frac{p_2}{p_4}\right)^{\frac{\gamma-1}{\gamma}} - 1\right]}$$

the compressor;

$p_4$ and $T_4$ are the same as the atmosphere pressure and temperature $p_a$ and $T_a$;

$$W_t = A_t\left(\frac{p_3}{p_t}, u_{VGT}\right)\frac{p_3}{\sqrt{RT_3}}\sqrt{\frac{2\gamma}{\gamma-1}\left[\left(\frac{p_t}{p_3}\right)^{\frac{2}{\gamma}} - \left(\frac{p_t}{p_3}\right)^{\frac{\gamma+1}{\gamma}}\right]}$$

rate through the turbine;

$$p_t = p_a + \frac{0.5 RT_t}{p_a}\left[\frac{W_C + W_f}{A_a}\right]^2; \text{ and}$$

$$T_t = T_3 - \eta_t T_3\left(1 - \left(\frac{p_t}{p_3}\right)^{\frac{\gamma-1}{\gamma}}\right)$$

Assuming the temperature of the gas flowing into the cylinder is the same as the intake manifold temperature, then $T_1 = T_e$. If the engine is equipped with an inlet mass air flow meter (MAF), $W_C$ can be measured.

Values for $p_t$ can be calculated from Equations (23) and (36), which requires solving a polynomial equation. In practice, today's passenger car diesel engines are usually equipped with a sensor to measure the delta pressure across the exhaust-treatment systems for diagnosis and regeneration purposes. As an alternative to the calculation, the relationship $p_t = p_a + \Delta p_a$ can be used, where $\Delta p_a$ is the measured delta pressure across the exhaust-treatment systems.

In the above Equations (38)-(42), values are obtained for pressures (as a time derivative) at three sections of the engine intake as well as for the compressor power and the fresh air fraction. These values can be used to model the behavior of engine 100. Using the model, control unit 20 can be programmed to control in-cylinder conditions for optimum engine control, including determining when to switch modes and conditions that will achieve optimum mode transitions.

More specifically, for a given combustion mode, certain parameters such as pressure and fresh air ratio are desired. Each mode has different optimal pressures and fresh air fraction. The model can be used to determine the engine inputs that will result in the desired outputs. The inputs to the model control the various pressures the fresh air fraction. These inputs include the positions of the HP throttle 130 and EGR throttle 150 and the output of turbine 112. These inputs can then be used as control parameters for actuators of an actual engine for controller design, testing, and verification.

The above-described modeling approach resolves the non-minimum phase problem existing in the conventional diesel engine control-oriented dynamic models using necessary measurements and estimations for each section of the intake and exhaust passages. The modeling approach (modeling the dynamics of each section in the intake and exhaust passages with necessary measurement and estimations) can be easily expanded for engines with different intake and exhaust system configurations, such as dual-loop EGR systems.

What is claimed is:

1. A method of modeling a diesel engine operable for multiple combustion modes, the engine having an EGR (exhaust gas recirculation) throttle, HP (high pressure) throttle, and a turbocharger with a compressor and turbine, comprising:
   expressing the following engine condition values each as one of the following five state equations: a pressure at the intake manifold of the engine; pressure between the compressor and the HP throttle; pressure at the exhaust manifold of the engine; power produced by the compressor; and a fresh air fraction at the intake manifold;
   wherein the pressure at the intake manifold is calculated from the ideal gas law and from flow rates through the HP throttle, the EGR throttle, and the compressor;
   wherein the fresh air fraction at the intake manifold is calculated from the ideal gas law, from an air amount between the compressor and the HP throttle, and from an air amount in the exhaust manifold and wherein a plurality of actuators are used to control the fresh air fraction and pressure for a given combustion mode wherein a control unit controls in-cylinder conditions, including determining when to switch combustion modes and conditions to achieve optimal mode transitions;
   wherein the five state equations provide an engine model, which can be solved to provide the engine condition values;
   storing the state equations in a computer readable medium;
   substituting input values into the state equations; and
   wherein the input values include at least flow rates through the EGR throttle, HP throttle, and compressor turbine.

2. The method of claim 1, further comprising testing the input values on the diesel engine.

3. The method of claim 1, wherein the five state equations are in terms of time derivatives of the engine conditions.

4. The method of claim 1, wherein a state equation representing pressure between the compressor and HP throttle is derived from expressions representing conservation of mass between the compressor and the HP throttle.

5. The method of claim 1, wherein a state equation representing pressure at the exhaust manifold is derived from expressions representing conservation of mass at the exhaust manifold.

6. The method of claim 1, wherein a state equation representing compressor power is derived from expressions representing thermodynamics of the flow through the compressor.

7. The method of claim 1, wherein the compressor power is expressed as a time derivative based on simplification of the dynamics of the turbocharger as a first order system with a time constant.

8. The method of claim 1, wherein a state equation representing the fresh air fraction is a time derivative based on the fresh air fraction at the exhaust manifold and the flow rates through the HP throttle and the EGR throttle.

* * * * *